United States Patent Office 2,968,335
Patented Jan. 17, 1961

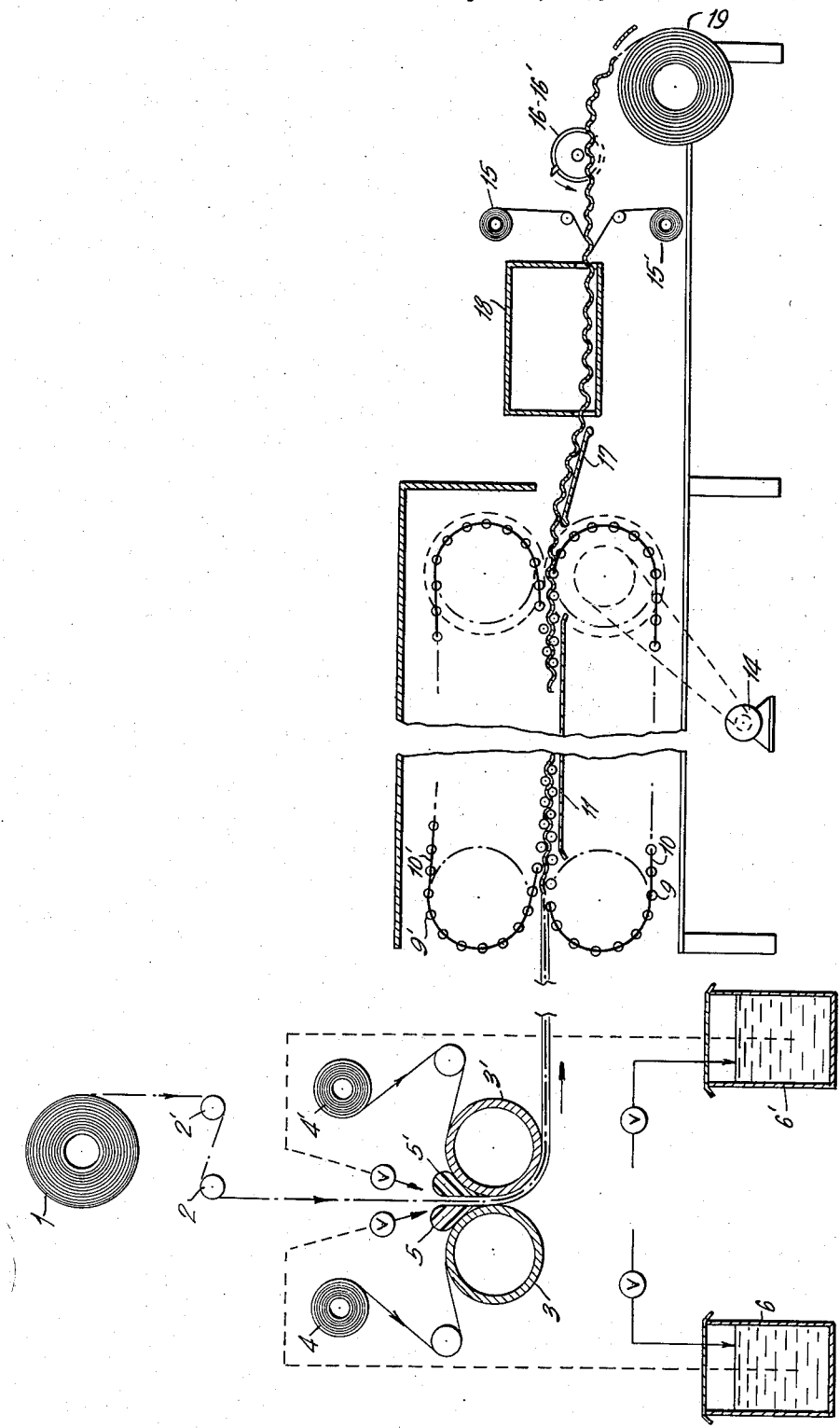

2,968,335

PROCESS FOR THE CONTINUOUS PRODUCTION OF CORRUGATED LAMINATES

Ugo Monaco, Olgiate Olona, and Piero Zanaboni, Milan, Italy, assignors to Montecatini, Societa Generale per l'Industria Mineraria e Chimica, Milan, Italy, a corporation of Italy Filed Apr. 6, 1955, Ser. No. 499,644

Claims priority, application Italy Sept. 28, 1954

8 Claims. (Cl. 154—33.05)

The present disclosure relates to an improved process for the continuous production of corrugated laminates and represents a continuation-in-part of the copending application of one of us, entitled "Process and Machine for the Continuous Production of Corrugated Sheets of Plastic Material," Serial No. 380,247, filed September 15, 1953. In said copending application, a process and machinery are disclosed for continuously producing corrugated laminates of mats from glass fiber, and other fibers, such as cellulosic fibers, bound to each other by chemical bonding materials which dissolve in subsequently added resin, mostly comprising a polystyrene emulsion or emulsions based on polyester, phenolic or melamine resins. According to said copending application, the mats are impregnated with a polyester resin and are passed, covered by two protective cellophane sheets, through a shaping roller machine which is substantially entirely enclosed by a heating oven in order to cure the impregnating resin. Upon emerging from the oven, the cellophane sheets are removed and the laminate is trimmed to specifications.

It has been found, however, that some kinds of mats, particularly mats of open and very spongy consistency provided with a transversal stitching of the type of mattress stitching instead of chemical bonding material to keep the fibers of the mat united, may yield unsatisfactory laminates when processed according to the aforementioned patent application, because of crazing that, occurring at the stitching, impairs the uniformity and mechanical properties of the laminates. The crazing is due primarily to the high amount of heat set free during the exothermic curing reaction. In fact, the lateral portions of the material, being in direct contact with heated surfaces of the afore-mentioned shaping roller machine, cure and shrink before the interior material, so that the latter, in the subsequent curing stages, causes an upward stress at the points of higher resin concentration along the transversal stitching which produces fissures at the outer surfaces.

We have now found an improved process which avoids these difficulties and, at the same time, offers a number of other technical and economic advantages. The new process consists, substantially, of the steps of corrugating a continuous mat in the cold and seasoning or curing the corrugated mat at room or elevated temperature. Moreover, the new process is applicable to any kind of a mat of this type, including mats held together by a suitable binder and without transversal stitching.

The process of this invention is characterized by the simultaneous use of a catalyzed resin and an accelerated resin which cures within a short time and without heating. Since a catalyzed and, at the same time, accelerated resin would remain fluid only a very short time, say several minutes at the most, we have devised an impregnating system which eliminates this difficulty; in other words, a system which, although permitting the use of an impregnation of this general type, nevertheless prevents premature setting or curing during the impregnating operation and while the mats are transferred to the mold.

To this end, and in accord with the present invention, we introduce the mat vertically between two horizontal rolls to which, at the same time and at obtuse angles to the mat, two cellophane sheets are fed while, by means of an appropriate spraying device, a portion of catalyzed resin is sprayed onto one of the rolls between the mat and the cellophane sheet while onto the other of the rolls between the mat and the cellophone sheet a portion of accelerated resin is sprayed so that the mat temporarily separates the two resin portions and prevents their instantaneous mixing.

The mixing of the catalyzed and the accelerated resin portion takes place while the mat passes between the impregnating rolls (which are set to exert a squeezing action) and continues until after commencement of curing of the mixture.

The novel features which we consider characteristic of our invention are set forth with particularity in the appended claims. The invention itself, however, and any additional objects and advantages thereof will best be understood from the following description when read in conjunction with the accompanying drawing, in which 1 indicates a reel for the untreated rolled-up mat, 2, 2' refer to guiding rolls, 3, 3' are resin-impregnating rolls, 4, 4' are reels supplying cellophane sheets, 5, 5' indicate resin portions accumulating in the nip between the mat and the respective rolls, and 6, 6' are tanks containing catalyzed resin and accelerated resin, respectively.

Having been impregnated by means of the foregoing device, the mat passes then to the shaping machine, preferably of the type described and claimed in the afore-mentioned copending patent application which, however, need not be mounted within a heating chamber. During passage of the mat through the shaping machine, formation of the corrugations and curing of the now admixed resin takes place without heating. The corrugating machine comprises corrugating rollers 9 and 9' attached respectively to upper and lower chain belts diagrammatically indicated at 10 and 10'. The lower belt and the upper belt are driven by motor 14. The cellophane sheets are removed and re-rolled at 15, 15'. The corrugated laminate is rolled up at 19 after being side-trimmed by cutters 16, 16'. In the absence of heat, the curing process is somewhat slower so that local, particularly lateral, overheating cannot take place and the previously-observed formation of cracks when the shaping was done in the presence of heat cannot occur any longer.

After leaving the shaping machine, the corrugated laminate must be seasoned in order to complete the curing process. This seasoning can be carried out either by letting the laminate stand at room temperature for some time (about two days) or by means of passing it, immediately upon emerging from the corrugating machine, through a flat metal chute 17 to dissipate part of the heat evolving during the exothermic reaction and then through a chamber 18 heated to 80–90° C. After complete cure of the laminate, the two cellophane sheets are taken off.

*Example 1*

The polyester resin employed for the impregnation is divided in two portions. To the first an accelerator consisting of dimethyl-aniline is added at a rate of 0.5%. To the second portion, a catalyst consisting of benzoyl peroxide is added at a rate of 1%.

These mixtures are sprayed, as above described, onto impregnating rolls, on which the two cellophane sheets arrive and between which a fibrous glass mat is introduced vertically.

The mat thus impregnated and covered by the cellophane sheets passes between two chains of rolls within which the corrugation takes place. The period of time in which the mat stays between the two chains is about twenty minutes. The corrugated laminate, after shaping, is completely cured while it slides through a flat metal chute and passes through a compartment heated to 80–90° C. for ten minutes; or by seasoning it in air at room temperature.

After complete curing, the corrugated laminate is separated from the cellophane sheets.

*Example 2*

The procedure is carried out as described in Example 1, except that one portion of the resin is accelerated with 6% cobalt naphthenate at a rate of 0.5%, and the second portion is catalyzed with methyl-ethyl-ketone peroxide at a rate of 2%.

The period of time during which the impregnated mat remains in the mold is about thirty minutes. Complete curing in the heated compartment requires about ten minutes.

*Example 3*

Following the procedures of Examples 1 and 2, the fibrous glass mat is replaced by a cellulose fiber mat and the cellophane sheets by other sheets of non-porous, non-adhesive material, for example by sheets of acrylate polymers.

We claim:

1. The process of producing a corrugated fiber-resin laminate, comprising moving a continuous fibrous mat into an impregnating position, impregnating said mat from one side with a cold-catalyst catalyzed portion of a polyester resin containing substantially no accelerator and from the other side with an accelerator containing portion of said polyester resin containing substantially no polymerization catalyst, subjecting said mat to a squeezing action to intermingle said two portions of the resin within the mat, then setting the intermingled resin in the cold while subjecting it to corrugation, and thereafter curing it.

2. The process according to claim 1, comprising passing the corrugated laminate over a distance sufficient to dissipate part of the reaction heat produced in intermingling said two portions of the polyester resin and curing the laminate at 80 to 90° C. for a short period of time.

3. The process of producing a corrugated fiber-resin laminate, comprising moving a continuous fibrous mat, provided with a transverse, mattress-type stitching, into an impregnating location, impregnating said mat from one side with one portion of polyester resin catalyzed with benzoyl peroxide containing substantially no accelerator, and from the other side with a second portion of said polyester resin accelerated with di-methylaniline containing substantially no polymerization catalyst, covering each side with a substantially non-adhesive and non-porous sheet, subjecting the mat covered with said sheets to squeezing action to intermingle said two portions of the resin within the mat, then setting the resin in the cold while corrugating it, curing the intermingled resin, and removing the sheets from the cured, corrugated laminate.

4. The process according to claim 3, wherein said mat is a fibrous glass mat and said substantially non-adhesive, non-porous sheets are cellophane sheets.

5. The process according to claim 3, wherein said mat is a cellulose fiber mat.

6. The process according to claim 3, wherein methyl-ethyl-ketone peroxide is the catalyst present in said one portion of the resin and cobalt naphthenate is the accelerator present in said second portion of the polyester resin.

7. The process of producing a reinforced, rolled corrugated fiber-resin laminate, comprising feeding a separate flexible, substantially non-adhesive and non-porous sheet partly around each of and in between a pair of horizontal pressure rolls, feeding a continuous mat of fibrous material from above toward the nip of said sheets on said pressure rolls, impregnating said mat from one side with a cold-catalyst catalyzed portion of a cold-setting polyester resin containing substantially no accelerator and from the other side with an accelerator containing portion of said polyester resin containing substantially no polymerization catalyst, feeding the impregnated mat in between the nip of said sheets, said pressure rolls serving to intermingle said two portions of the polyester resin and to enclose the compacted mat between said sheets, feeding the unit of impregnated mat enclosed by said sheets in between two endless belts imparting corrugations to said unit, regulating the time of travel of said unit in between said endless belts in order to secure the proper setting of the resin, the resin setting in the cold during said corrugating, storing the laminate to cure the resin and removing said sheets from the corrugated fiber-resin laminate.

8. The process according to claim 7, comprising passing the corrugated unit of impregnated mat enclosed by said sheets through a chute to dissipate part of the reaction heat produced in intermingling said two portions of the polyester resin and retaining said corrugated unit for about ten minutes within a compartment heated to 80 to 90° C.

References Cited in the file of this patent

UNITED STATES PATENTS

| | | |
|---|---|---|
| 2,015,806 | Menger | Oct. 1, 1935 |
| 2,088,158 | Spelman | July 27, 1937 |
| 2,406,051 | Weiss | Aug. 20, 1946 |
| 2,449,299 | Hurdis | Sept. 14, 1948 |
| 2,517,698 | Muskat | Aug. 8, 1950 |
| 2,787,314 | Anderson | Apr. 2, 1957 |